United States Patent
Ribarich

(10) Patent No.: US 9,712,050 B2
(45) Date of Patent: Jul. 18, 2017

(54) POWER CONVERTER UTILIZING A RESONANT HALF-BRIDGE AND CHARGE PUMP CIRCUIT

(71) Applicant: Infineon Technologies Americas Corp., El Segundo, CA (US)

(72) Inventor: Thomas J. Ribarich, Laguna Beach, CA (US)

(73) Assignee: Infineon Technologies Americas Corp., El Segundo, CA (US)

( * ) Notice: Subject to any disclaimer, the term of this patent is extended or adjusted under 35 U.S.C. 154(b) by 33 days.

(21) Appl. No.: 14/742,591

(22) Filed: Jun. 17, 2015

(65) Prior Publication Data
US 2016/0020693 A1    Jan. 21, 2016

Related U.S. Application Data

(60) Provisional application No. 62/025,943, filed on Jul. 17, 2014.

(51) Int. Cl.
| | |
|---|---|
| *H02M 3/335* | (2006.01) |
| *H02M 3/07* | (2006.01) |
| *H02M 3/158* | (2006.01) |
| *H02M 3/156* | (2006.01) |
| *H02M 3/155* | (2006.01) |
| *H02M 1/44* | (2007.01) |
| *H02M 1/00* | (2006.01) |

(52) U.S. Cl.
CPC ............ *H02M 3/07* (2013.01); *H02M 3/156* (2013.01); *H02M 3/158* (2013.01); *H02M 1/44* (2013.01); *H02M 2001/007* (2013.01); *H02M 2001/0058* (2013.01); *H02M 2003/1557* (2013.01); *Y02B 70/1425* (2013.01); *Y02B 70/1433* (2013.01); *Y02B 70/1491* (2013.01)

(58) Field of Classification Search
CPC .... H02M 3/156; H02M 3/1588; H02M 3/157; H02M 3/07; Y02B 70/1433
USPC ....... 363/21.02, 21.03, 59, 60; 323/222, 271, 323/282–283
See application file for complete search history.

(56) References Cited

U.S. PATENT DOCUMENTS

| | | | |
|---|---|---|---|
| 2014/0232359 A1* | 8/2014 | Dash ..................... | H02M 3/158 323/235 |
| 2014/0232361 A1* | 8/2014 | Dally ..................... | G01R 27/14 323/271 |

\* cited by examiner

*Primary Examiner* — Nguyen Tran
(74) *Attorney, Agent, or Firm* — Slater Matsil, LLP

(57) ABSTRACT

A power converter is disclosed. The power converter includes a resonant half-bridge having a first power switch and a second power switch for driving a resonant circuit of the resonant half-bridge. The power converter further includes a charge pump coupled to the resonant half-bridge, where the charge pump is configured to selectively provide a positive current from the resonant circuit to an output stage of the power converter, and to selectively shunt to ground a negative current from the resonant circuit, based on an output stage feedback signal. In one implementation, the resonant circuit includes a series L-C circuit. The power converter is configured to provide a constant output current and/or a constant output voltage.

25 Claims, 6 Drawing Sheets

Buck Converter Waveforms

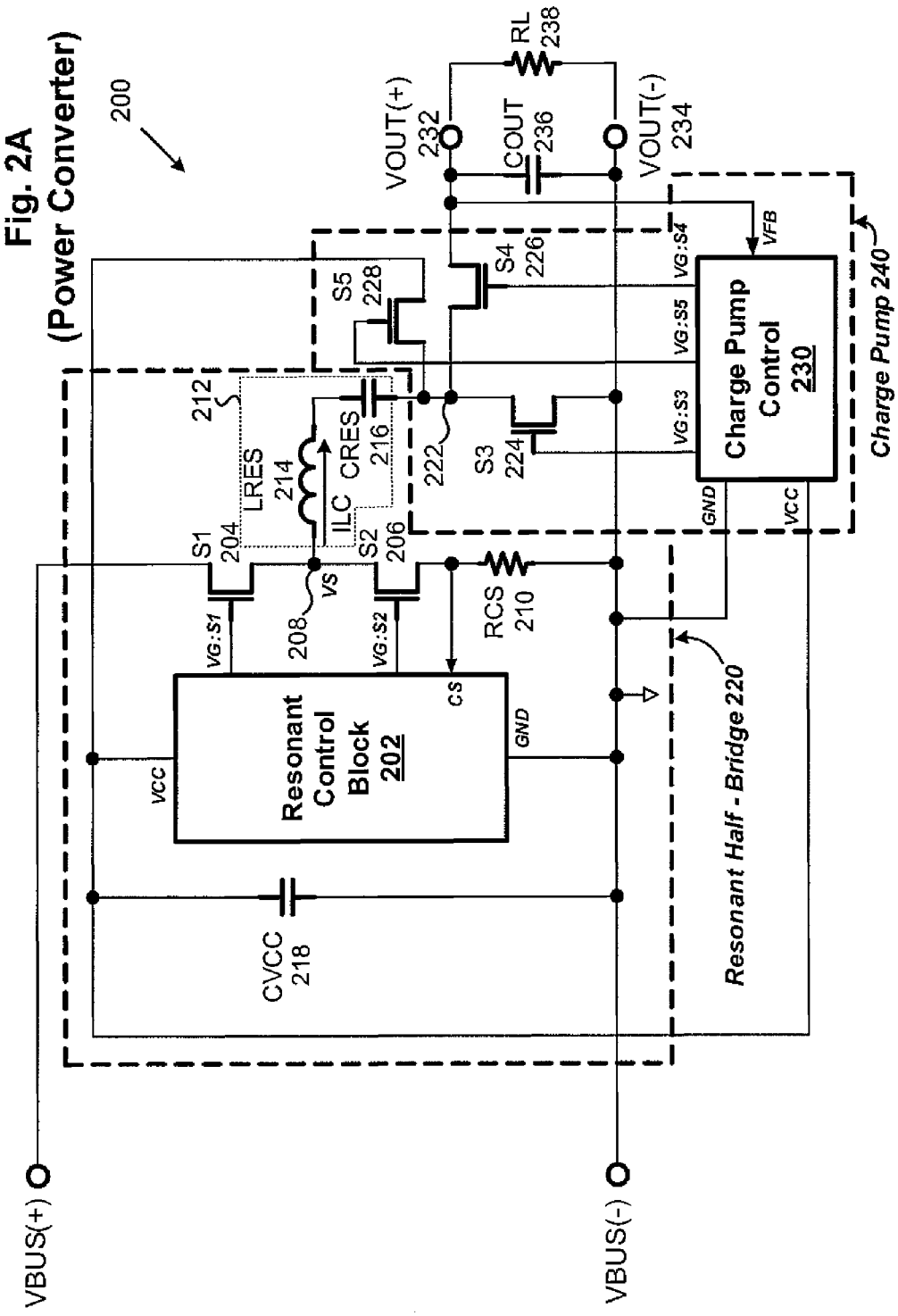

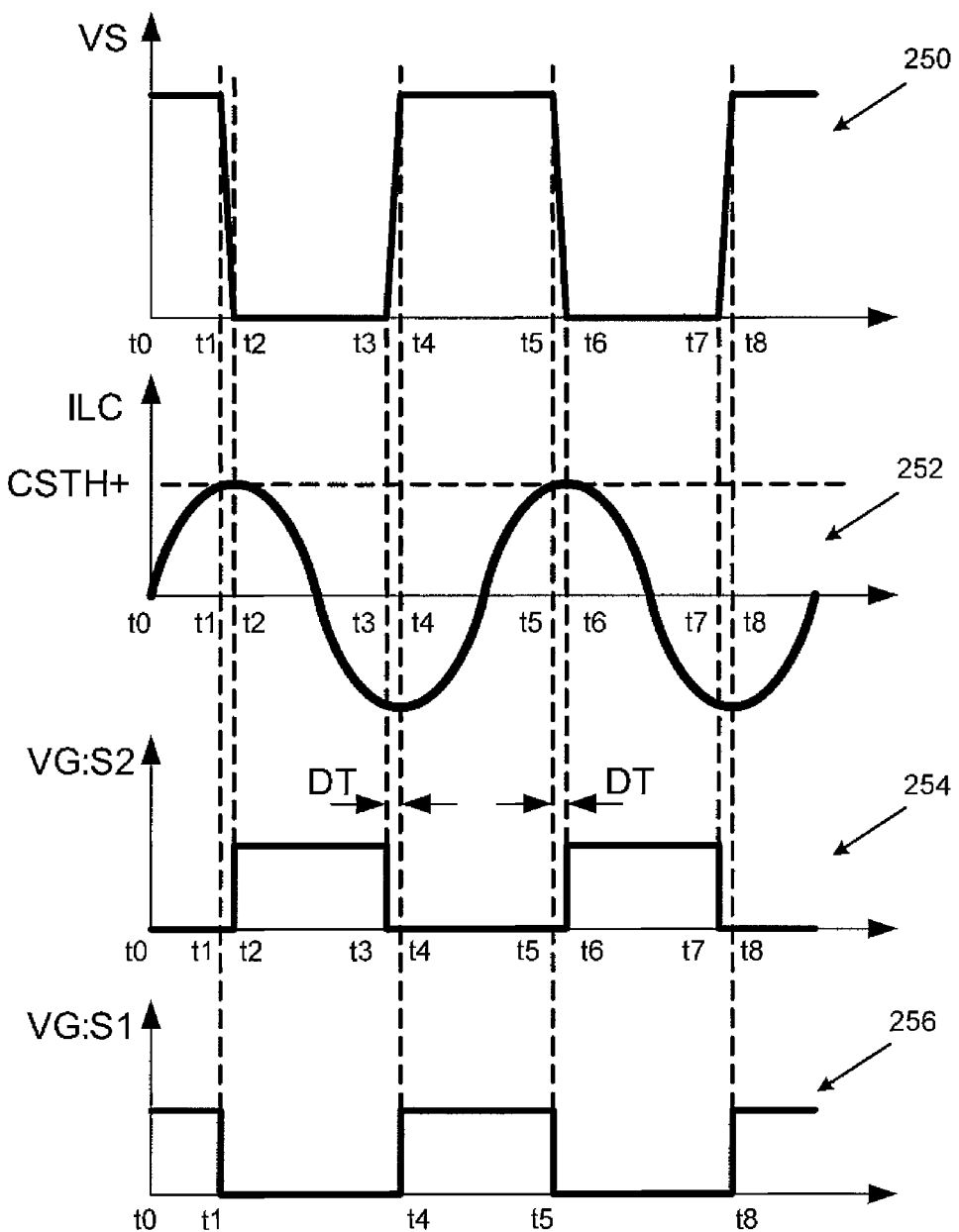

US 9,712,050 B2

POWER CONVERTER UTILIZING A RESONANT HALF-BRIDGE AND CHARGE PUMP CIRCUIT

The present application claims the benefit of and priority to a provisional patent application entitled "Resonant Half-Bridge and Charge Pump Circuit," Ser. No. 62/025,943 filed on Jul. 17, 2014. The disclosure in this provisional application is hereby incorporated fully by reference into the present application.

BACKGROUND

Buck converters are commonly utilized to convert a high DC voltage to a low DC voltage. A buck converter typically includes a high-side switch disposed between an input and an output of the buck converter, and a low-side switch disposed between the output of the buck converter and ground. The buck converter can include a control circuit to control a duty cycle of either or both of the high-side and low-side switches so as to convert a high input voltage to a low output voltage.

Because the high-side switch is often limited by its switching speed, it is difficult for a conventional buck converter to achieve a conversion ratio (i.e., the ratio of input voltage to output voltage) that is much greater than 10. Additionally, as the conventional buck converters generate high electromagnetic interference and high switching noise during operation, filters are often required to reduce electromagnetic interference (EMI) and switching noise, thereby undesirably increasing the size and manufacturing cost of the conventional buck converters.

Thus, there is a need in the art for a high efficiency power converter that can achieve a high conversion ratio at high switching frequency with low switching loss and low switching noise.

SUMMARY

The present disclosure is directed to a power converter utilizing a resonant half-bridge and charge pump circuit, substantially as shown in and/or described in connection with at least one of the figures, and as set forth in the claims.

BRIEF DESCRIPTION OF THE DRAWINGS

FIG. 2A illustrates an exemplary power converter, according to one implementation of the present application.

FIG. 2B illustrates exemplary waveforms of a resonant half-bridge of a power converter, according to one implementation of the present application.

DETAILED DESCRIPTION

Figure 1A:
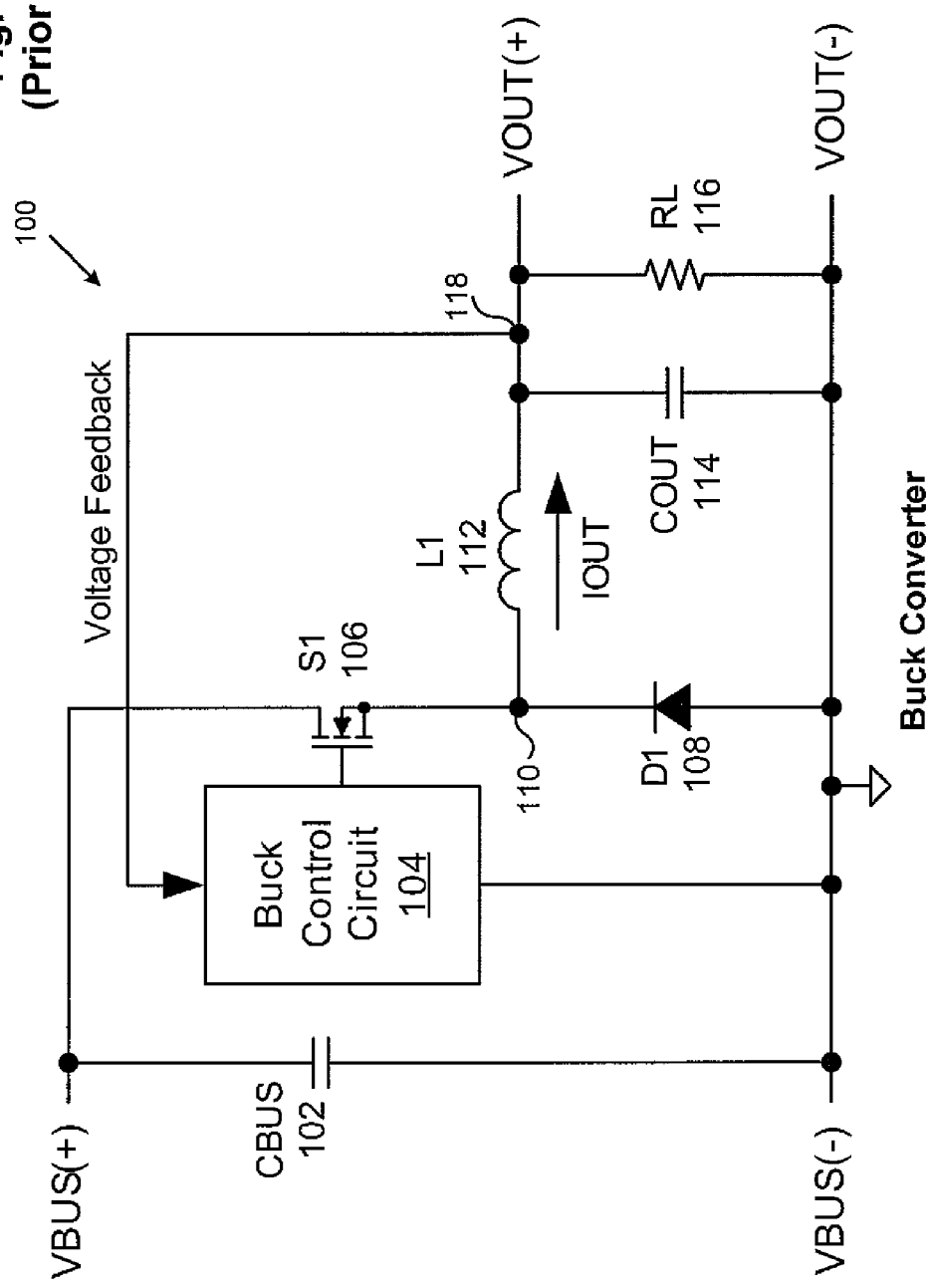
FIG. 1A illustrates a conventional buck converter.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1A shows a conventional buck converter. Conventional buck converter 100 includes bus capacitor 102 ($C_{BUS}$) coupled across DC bus voltage supply $V_{BUS}$, buck control circuit 104, switch 106 (S1), diode 108 (D1), inductor 112 (L1), output capacitor 114 ($C_{OUT}$), and output load 116 ($R_L$).

As illustrated in FIG. 1A, bus capacitor 102 is coupled across positive DC bus voltage supply terminal $V_{BUS(+)}$ and negative DC bus voltage supply terminal $V_{BUS(-)}$. A drain of switch 106 is coupled to positive DC bus voltage supply terminal $V_{BUS(+)}$. A source of switch 106 is coupled to inductor 112 and a cathode of diode 108 at node 110. A gate of switch 106 is coupled to buck control circuit 104 providing a driving signal for driving switch 106. An anode of diode 108 is coupled to ground. Inductor 112 is series connected to output capacitor 114 at output node 118. Output capacitor 114 and output load 116 are connected in parallel to each other between output node 118 and ground.

Figure 1B:
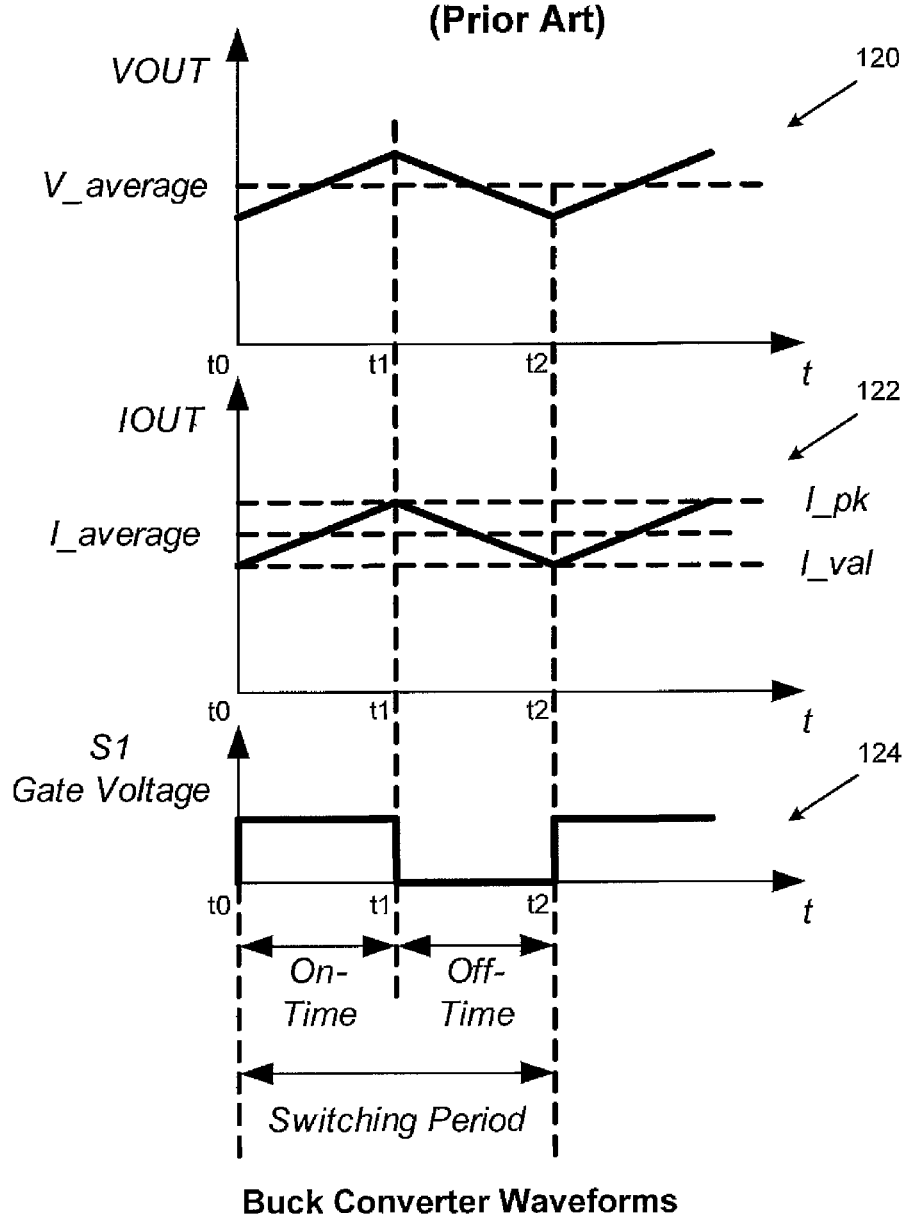
FIG. 1B illustrates exemplary waveforms of a conventional buck converter.

FIG. 1B illustrates exemplary waveforms of a conventional buck converter, such as conventional buck converter 100 in FIG. 1A, in operation. For example, waveform 120 illustrates output voltage $V_{OUT}$ across output load 116 between output node 118 and ground. Waveform 122 illustrates current $I_{OUT}$ flowing through inductor 112, output capacitor 114 and output load 116. Waveform 124 illustrates the gate voltage of switch 106.

In operation, at $t=t_0$, the gate voltage of switch 106 is switched HIGH, and switch 106 is turned ON. Between $t=t_0$ and $t=t_1$, while switch 106 is ON and diode 108 is OFF, current flows from positive DC bus voltage supply terminal $V_{BUS(+)}$, through inductor 112, output capacitor 114, and output load 116, to ground, to which negative DC bus voltage supply terminal $V_{BUS(-)}$ is coupled. As illustrated in FIG. 1B, while switch 106 is ON between $t=t_0$ and $t=t_1$, current $I_{OUT}$ flowing in the loop ramps up linearly, due to inductor 112, from a lower valley level (I_val) to a peak level (I_pk). Output voltage $V_{OUT}$ also ramps up linearly while output capacitor 114 is charged between $t=t_0$ and $t=t_1$.

At $t=t_1$, the gate voltage of switch 106 is switched LOW, thereby turning OFF switch 106 (S1). When switch 106 is turned OFF, diode 108 is turned ON, current $I_{OUT}$ continues to flow through inductor 112, output capacitor 114 and output load 116, and back through diode 108 to inductor 112. As illustrated in FIG. 1B, while switch 106 is OFF between $t=t_1$ and $t=t_2$, current $I_{OUT}$ flowing in the loop ramps down linearly, due to inductor 112, from the peak level (I_pk) to the lower valley level (I_val). Output voltage $V_{OUT}$ also ramps down linearly while output capacitor 114 is discharged between $t=t_1$ and $t=t_2$. At the end of the switching period, at $t=t_2$, switch 106 is turned ON, diode 108 is turned OFF, to start another switching cycle.

As shown in waveform 120 in FIG. 1B, current $I_{OUT}$ flows in the loop through output capacitor 114 and output load 116, resulting in an average output voltage (e.g., V_average) with a peak-to-peak ripple. Buck control circuit 104 measures the output voltage at output node 118 and continuously adjusts the on-time and off-time of switch 106 to maintain the average output voltage at a desired level. Although conventional buck converter 100 may convert a higher voltage level down to a lower voltage level, it also suffers from high switching losses, high switching noise, and limited maximum operating frequency.

For example, a DC bus voltage supply (e.g., $V_{BUS}$) may be around 400 volts, while a consumer electronics DC supply voltage (e.g., $V_{OUT}$) may be as low as 5 volts. If the ratio of $V_{BUS}$ to $V_{OUT}$ is too high, then when switch 106 is turned ON, a large current flows through inductor 112, output capacitor 114 and output load 116. Thus, switch 106 needs to be turned OFF rapidly. As a result, switch 106 may in fact have a very small duty cycle of approximately 1% on-time in a switching period despite what's shown in waveform 124 in FIG. 1B. Moreover, buck control circuit 104 cannot practically reach such low duty cycles when driving switch 106.

In addition, node 110 between the source of switch 106 and the cathode of diode 108 is switched up and down with a very fast slew rate. For example, when switch 106 is turned OFF, node 110 is close to ground (e.g., 0 volts). Then, as switch 106 is turned ON, the voltage at node 110 jumps very quickly from 0 volts to DC bus voltage supply $V_{BUS}$ (e.g., 400 volts). As the switching repeats in each switching cycle, conventional buck converter 100 suffers from high switching losses, high switching noise, limited maximum operating frequency, and high stress.

Thus, there is a need for a solution that can switch from a high bus voltage (e.g., 400 volts or more) to a substantially constant consumer electronics DC supply voltage (e.g., 15 volts or lower) using a single conversion stage with high switching frequency (e.g., 1 MHz or above), 50% duty cycle, and soft switching.

FIG. 2A illustrates power converter 200, according to one implementation of the present application. Power converter 200 includes resonant half-bridge 220 and charge pump 240 coupled between DC bus voltage supply $V_{BUS}$ and an output stage of power converter 200. As illustrated in FIG. 2A, resonant half-bridge 220 includes capacitor 218 ($C_{VCC}$), resonant control block 202, power switch 204 (S1), power switch 206 (82), sensing element 210 ($R_{CS}$), and resonant circuit 212 having inductor 214 ($L_{RES}$) and capacitor 216 ($C_{RES}$). Charge pump 240 includes charge pump control 230, switch 224 (S3), switch 226 (S4), and switch 228 (S5). The output stage includes output capacitor 236 ($C_{OUT}$) and output load 238 ($R_L$) connected in parallel between positive output terminal 232 $V_{OUT(+)}$ and negative output terminal 234 $V_{OUT(-)}$.

As illustrated in FIG. 2A, in resonant half-bridge 220, power switch 204 and power switch 206 are connected in totem pole configuration (i.e. half-bridge configuration) between positive DC bus voltage supply terminal $V_{BUS(+)}$ and negative DC bus voltage supply terminal $V_{BUS(-)}$. As shown in FIG. 2A, a first terminal of power switch 204 is coupled to positive DC bus voltage supply terminal $V_{BUS(+)}$. A second terminal of power switch 204 is coupled to a first terminal of power switch 206 and inductor 214 at switched node 208. A second terminal of power switch 206 is coupled to negative DC bus voltage supply terminal $V_{BUS(-)}$ through sensing element 210.

In an implementation, power switch 204 and power switch 206 may each be, for example, a silicon field effect transistor (FET), such as a silicon metal-oxide semiconductor FET (MOSFET). In another implementation, power switch 204 and power switch 206 may each be a group III-V semiconductor device, such as a gallium nitride (GaN) device, which can be a GaN high electron mobility transistor (HEMT). In other implementations, power switches 204 and 206 may be any other suitable control devices, such as bipolar junction transistors (BJTs) and insulated gate bipolar transistors (IGBTs).

As illustrated in FIG. 2A, capacitor 218 is coupled across resonant control block 202 to provide supply voltage $V_{CC}$ to resonant control block 202. Resonant control block 202 is configured to drive power switch 204 and power switch 206 to provide voltage VS at switched node 208 to resonant circuit 212. For example, resonant control block 202 provides a high side control signal (VG:S1) to a gate of power switch 204 for driving power switch 204. Resonant control block 202 also provides a low side control signal (VG:S2) to a gate of power switch 206 for driving power switch 206.

As illustrated in FIG. 2A, sensing element 210 is coupled to between power switch 206 and ground. For example, sensing element 210 is utilized to measure the peak current at each switching cycle, to make sure the current at switched node 208 is at a substantially constant level. In the present implementation, sensing element 210 may include, for example, at least one current-sensing resistor (e.g., $R_{CS}$). For example, sensing element 210 may include a resistor having a resistance of less than approximately 1.0 ohm.

As illustrated in FIG. 2A, sensing element 210 may provide switching stage feedback signal CS containing a direct measurement of the half-bridge current to resonant control block 202. Based on switching stage feedback signal CS, resonant control block 202 can be configured to control the respective on-times of power switch 204 and power switch 206 by providing appropriate drive signals to the respective control terminals (e.g. gates) of power switch 204 and power switch 206. In an implementation, resonant control block 202 may be configured to cause each of power switch 204 and power switch 206 to have a substantially constant duty cycle at a switching frequency of 1 MHz or more. In an implementation, resonant control block 202 may be configured to cause each of power switch 204 and power switch 206 to have a duty cycle of, for example, approximately 50.0 percent.

As illustrated in FIG. 2A, resonant circuit 212 is coupled to power switch 204 and power switch 206 at switched node 208. In the present implementation, resonant circuit 212 may be an L-C series circuit having inductor 214 and capacitor 216. Capacitor 216 provides an appropriate capacitance for resonant circuit 212 and inductor 214 provides an appropriate inductance for resonant circuit 212. In other implementations, resonant circuit 212 may include other suitable resonant circuit elements.

As mentioned above, illustrated in FIG. 2A, resonant control Nock 202 may adjust the on-times of power switch 204 and power switch 206 to provide a substantially constant current at switched node 208 to resonant circuit 212. As power switch 204 and power switch 206 are switched ON and OFF in a complementary manner, the current flowing through inductor 214 and capacitor 216 may have a substantially sinusoidal shape, in the form of a quasi-sinusoidal AC current.

As illustrated in FIG. 2A, charge pump 240 is coupled between resonant half-bridge 220 and the output stage of power converter 200. The output of resonant circuit 212 is coupled to an input of charge pump 240 at node 222. An output of charge pump 240 is coupled to the output stage of power converter 200.

Charge pump 240 includes charge pump control 230, switch 224, switch 226, and switch 228. For example, a first terminal of switch 224, a first terminal of switch 226, and a first terminal of switch 228 are coupled to the output of resonant circuit 212 of resonant half-bridge 220 at node 222. A second terminal of switch 224 is coupled to ground. A second terminal of switch 226 is coupled to the output stage of power converter. A second terminal of switch 228 is coupled to capacitor 218.

In an implementation, switch 224, switch 226, and switch 228 may each be, for example, a silicon field effect transistor (FET), such as a silicon metal oxide semiconductor field effect transistor (MOSFET). In another implementation, switch 224, switch 226, and switch 228 may each be, for example, a group III-V semiconductor device, such as a GaN device, which can be a GaN HEMT. In other implementations, switch 224, switch 226, and switch 228 may be any other control devices, such as bipolar junction transistors (BJTs), insulated gate bipolar transistors (IGBTs), and diodes.

As illustrated in FIG. 2A, charge pump control 230 is coupled to a control terminal (e.g., gate) of each of switch 224, switch 226, and switch 228. Charge pump control 230 is configured to switch each of switch 224, switch 226, and switch 228 to selectively provide a positive current from resonant circuit 212 to the output stage of power converter 200, to selectively shunt to ground a negative current from resonant circuit 212, and to selectively charge capacitor 218. For example, charge pump control 230 provides a control signal (VG:S3) to a gate of switch 224 to selectively turn ON switch 224. Charge pump control 230 provides a control signal (VG:S4) to a gate of switch 226 to selectively turn ON switch 226. Charge pump control 230 also provides a control signal (VG:S5) to a gate of switch 228 to selectively turn ON switch 228. Charge pump control 230 also receives output stage feedback signal $V_{FB}$, from positive output terminal 232 $V_{OUT(+)}$. Based on output stage feedback signal $V_{FB}$, charge pump 240 may operate in either a normal charge pump mode or a charge pump bypass/shunt mode, as discussed in detail below.

FIG. 2B illustrates exemplary waveforms of resonant half-bridge 220 of power converter 200 in FIG. 2A. For example, waveform 250 illustrates voltage VS at switched node 208 between power switch 204 and power switch 206. Waveform 252 illustrates current $I_{LC}$ flowing through inductor 214 and capacitor 216. Waveform 254 illustrates the gate voltage of power switch 206. Waveform 256 illustrates the gate voltage of power switch 204.

As shown in waveforms 254 and 256, power switch 206 and power switch 204 are switched ON and OFF by resonant control block 202 in a complimentary manner with a dead time (DT) inserted between each time power switch 204 is turned ON and power switch 206 is turned OFF, and between each time power switch 204 is turned OFF and power switch 206 is turned ON, to prevent a short circuit or shoot through condition.

As power switch 204 and power switch 206 are switched ON and OFF complimentary to each other, a high-frequency substantially square-wave voltage signal (VS) with trapezoidal edges (e.g., waveform 250) is produced at switched node 208 that oscillates between DC bus voltage supply $V_{BUS}$ (e.g., power switch 204 'ON', power switch 206 'OFF') and ground (e.g., power switch 204 'OFF', power switch 206 'ON'). Voltage VS is a substantially square-wave with trapezoidal edges, as shown in waveform 250. Voltage VS causes current $I_{LC}$ to flow through resonant circuit 212 and through charge pump 240 of power converter 200. The peak of current $I_{LC}$ is monitored by resonant control block 202 at node CS through sensing element 210 (e.g., a current-sensing resistor, $R_{CS}$). The frequency and/or duty-cycle of power switch 204 and power switch 206 may be continuously adjusted to keep the peak current regulated to a constant current threshold level ($CS_{TH+}$). As shown in waveform 252, current $I_{LC}$ is a quasi-sinusoidal AC current (hereinafter "quasi-sinusoidal AC current $I_{LC}$") with a substantially constant amplitude and approximately 50% duty cycle flowing from resonant circuit 212 of resonant half-bridge 220 to charge pump 240 through node 222.

The operation of resonant half-bridge 220 of power converter 200 is discussed below, with reference to waveforms 250 through 256 in an exemplary switching period, for example, from $t=t_4$ to $t=t_8$. As shown in waveform 256, at $t=t_4$, resonant control block 202 is configured to switch the gate voltage of power switch 204 HIGH to turn ON power switch 204. Prior to turning ON power switch 204, resonant control block 202 is configured to switch the gate voltage of power switch 206 LOW, as shown in waveform 254, to turn OFF power switch 206 at $t=t_3$, where a dead time is inserted between $t=t_3$ and $t=t_4$ to prevent a short circuit or shoot through condition. As shown in waveforms 254 and 256, between $t=t_4$ and $t=t_5$, power switch 204 is ON, power switch 206 is OFF. As discussed above, as resonant control block 202 utilizes sensing element 210 utilized to measure the peak current to make sure the current at switched node 208 is at a substantially constant level. As shown in waveforms 250 and 252, between $t=t_4$ and $t=t_5$, voltage VS is switched to DC bus voltage supply $V_{BUS}$, for example, and quasi-sinusoidal AC current $I_{LC}$ flows from switched node 208 through inductor 214 and capacitor 216 of resonant circuit 212.

As shown in waveforms 252 and 256, at $t=t_5$, quasi-sinusoidal AC current $I_{LC}$ reaches upper threshold level $CS_{TH+}$, for example, sensed by sensing element 210, then resonant control block 202 is configured to switch the gate voltage of power switch 204 LOW, thereby turning OFF power switch 204. After power switch 204 is turned OFF, resonant control block 202 is configured to switch the gate voltage of power switch 206 HIGH, as shown in waveform 254, to turn ON power switch 206 at $t=t_6$, where another dead time is inserted between $t=t_5$ and $t=t_6$ to prevent a short circuit or shoot through condition. As shown in waveform 250, between $t=t_5$ and $t=t_6$, voltage VS ramps down substantially linearly from DC bus voltage supply $V_{BUS}$ to ground. At $t=t_6$, voltage VS is substantially at 0 volts (i.e., ground), for example.

As shown in waveforms 254 and 256, between $t=t_6$ and $t=t_7$, while power switch 204 is OFF, power switch 206 is ON. Quasi-sinusoidal AC current $I_{LC}$ continues to flow from switched node 208 through inductor 214 and capacitor 216 of resonant circuit 212 in the form of a quasi-sinusoidal AC current. As shown in waveform 252, at $t=t_7$, quasi-sinusoidal AC current $I_{LC}$ reaches an low threshold level $CS_{TH-}$ (not explicitly shown in FIG. 2B), for example, sensed by sensing element 210, then resonant control block 202 is configured to switch gate voltage of power switch 206 LOW, thereby turning OFF power switch 206, as shown in waveform 254. Thereafter, after another dead time, the switching cycle may start again at $t=t_8$.

It is noted that voltage VS in waveform 250 shows a slight trapezoidal shape at its rising and falling edges. This illustrates resonant half-bridge 220's ability to achieve soft switching. For example, as shown in waveform 250 of FIG. 2B, before power switch 204 is turned ON at $t=t_4$, for example, resonant control block 202 is configured to turn OFF power switch 206 at $t=t_3$, as shown in waveforms 254 and 256. As a result, as shown in waveform 250, voltage VS at switched node 208 ramps up to DC bus voltage supply $V_{BUS}$ during the dead time between $t=t_3$ and $t=t_4$. Thus, at $t=t_4$, when power switch 204 is turned ON, voltage VS at switched node 208 is already at DC bus voltage supply $V_{BUS}$. Inversely, as shown in waveform 250 of FIG. 2B, at t=$t_5$, before power switch 206 is turned ON at t=$t_6$, for example, resonant control block 202 is configured to turn OFF power switch 204 at t=$t_5$, as shown in waveforms 254 and 256. As a result, as shown in waveform 250, voltage VS at switched node 208 ramps down from DC bus voltage supply $V_{BUS}$ to ground during the dead time between t=$t_5$ and t=$t_6$. Thus, at t=$t_6$, when power switch 206 is turned ON, voltage VS at switched node 208 is already at ground. Thus, among other advantages, resonant half-bridge 220 can avoid hard switching and substantially reduce switching losses. This also allows power switches 204 and 206 to be switched at much higher frequencies, such as 1 MHz to 10 MHz.

It is noted that because the switching frequency of resonant half-bridge 220 can be increased to 1 MHz or above, the increase in switching frequency leads to reduction in size for inductor 214 and capacitor 216 of resonant circuit 212. In an implementation, inductor 214 may have an inductance of, for example, equal to less than 470 microhenries (μH). In another implementation, inductor 214 may have an inductance of, for example, equal to less than 100 microhenries (μH). In an implementation, capacitor 216 may have a capacitance of, for example, equal to 1 nanofarads (nF). In another implementation, capacitor 216 may have a capacitance of, for example, less than 1 nanofarads (nF). As such, resonant circuit 212 of resonant half-bridge 220 may adopt chip inductors and capacitors, as opposed to conventional wire winding inductors and bulky capacitor plates, thereby significantly reducing the overall cost and size of power converter 200.

Figure 2C:
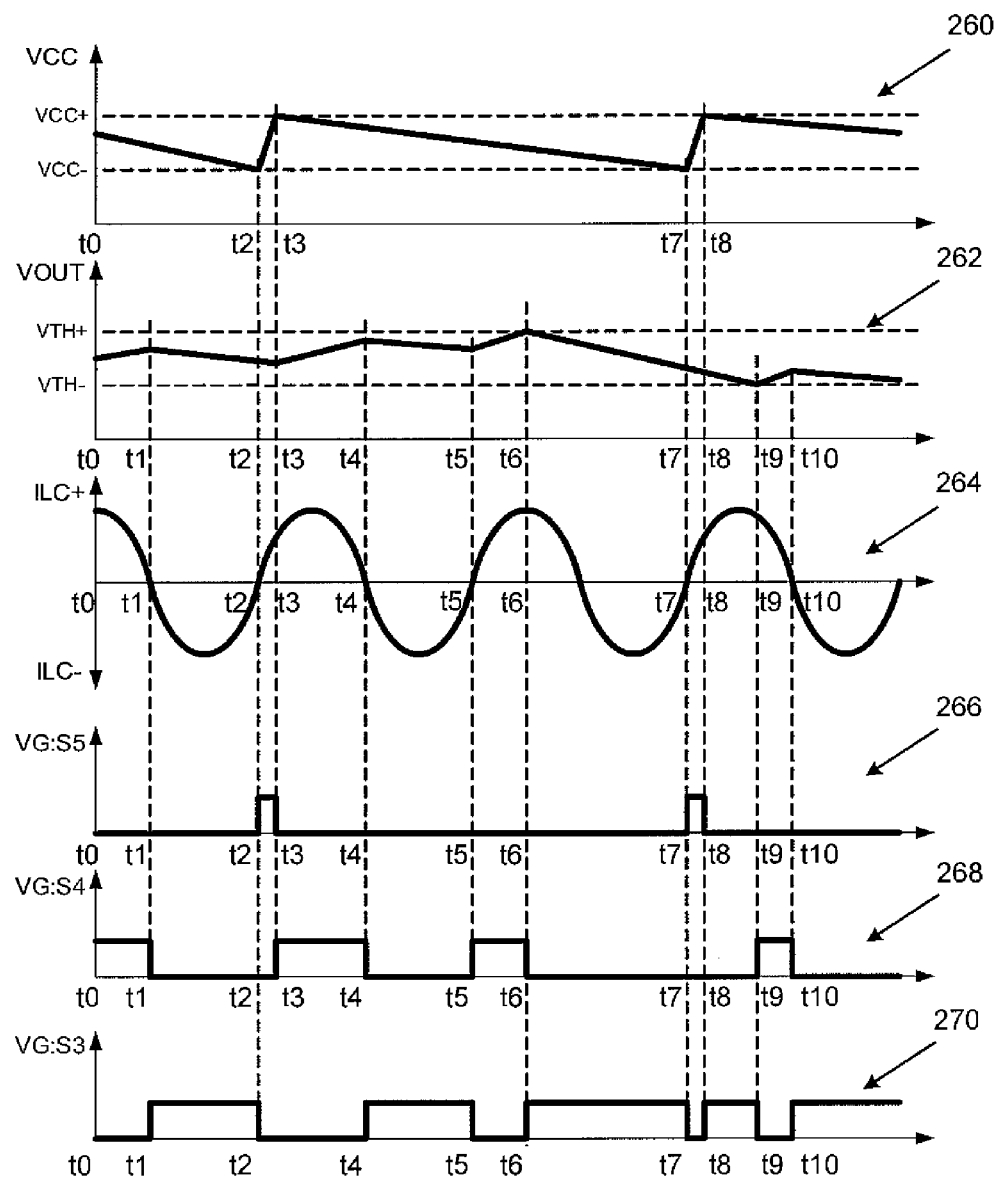
FIG. 2C illustrates exemplary waveforms of a charge pump of a power converter, according to one implementation of the present application.

FIG. 2C illustrates exemplary waveforms of charge pump 240 of power converter 200 in FIG. 2A. For example, waveform 260 illustrates supply voltage $V_{CC}$ across capacitor 218. Waveform 262 illustrates output voltage $V_{OUT}$ of the output stage of power converter 200, across positive output terminal 232 $V_{OUT(+)}$ and negative output terminal 234 $V_{OUT(-)}$. Waveform 264 illustrates quasi-sinusoidal AC current $I_{LC}$ flowing from resonant circuit 212 of resonant half-bridge 220 to charge pump 240 through node 222. For example, waveform 264 in FIG. 2C may correspond to waveform 252 in FIG. 2B. Waveform 266 illustrates the gate voltage of switch 228. Waveform 268 illustrates the gate voltage of switch 226. Waveform 270 illustrates the gate voltage of switch 224.

Charge pump 240 of power converter 200 is configured to provide a current path for the positive portion ($I_{LC+}$) of quasi-sinusoidal AC current $I_{LC}$ to flow to output capacitor 236 and output load 238 of the output stage of power converter 200. Also, charge pump 240 is configured to provide a by-pass shunt path for the negative portion ($I_{LC-}$) of quasi-sinusoidal AC current $I_{LC}$ to flow from ground back to resonant circuit 212. The by-pass shunt path of charge pump 240 is also used to shunt the positive portion ($I_{LC+}$) of quasi-sinusoidal AC current $I_{LC}$ to ground when output voltage $V_{OUT}$ has reached pre-determined upper threshold level $V_{TH+}$ in waveform 262.

To enable quasi-sinusoidal AC current $I_{LC}$ to flow to the load or to be shunted to ground, charge pump 240 includes two main switches, switch 224 and switch 226, controlled by charge pump control 230. Switch 226 is selectively turned ON to provide a path for the positive portion ($I_{LC+}$) of quasi-sinusoidal AC current $I_{LC}$ to flow to output capacitor 236 and output load 238 of the output stage of power converter 200. Switch 224 is selectively turned ON to shunt the negative portion ($I_{LC-}$) of quasi-sinusoidal AC current $I_{LC}$, and to shunt the positive portion ($I_{LC+}$) of quasi-sinusoidal AC current $I_{LC}$ to ground when output voltage $V_{OUT}$ has reached pre-determined upper threshold level $V_{TH+}$ in waveform 262.

During a positive half-cycle of quasi-sinusoidal AC current $I_{LC}$, switch 224 is turned OFF and switch 226 is turned ON, and the positive portion ($I_{LC+}$) of quasi-sinusoidal AC current $I_{LC}$ flows through resonant circuit 212 and switch 226 to output capacitor 236 and output load 238. Output voltage $V_{OUT}$ is monitored by charge pump control 230 receiving output stage feedback signal $V_{FB}$. When output voltage $V_{OUT}$ reaches pre-determined upper threshold level $V_{TH+}$ in waveform 262, switch 226 is turned OFF and switch 224 is turned ON for the remainder of the positive portion ($I_{LC+}$) of quasi-sinusoidal AC current $I_{LC}$ to shunt to ground.

During a negative half-cycle of quasi-sinusoidal AC current $I_{LC}$, switch 224 is turned ON to provide a path for the negative portion ($I_{LC-}$) of quasi-sinusoidal AC current $I_{LC}$ to continue to flow from ground back to resonant circuit 212, for example. When output voltage $V_{OUT}$ discharges to pre-determined lower threshold level $V_{TH-}$ in waveform 262, and during the positive half-cycle of quasi-sinusoidal AC current $I_{LC}$, switch 224 is turned OFF to stop shunting current to ground, and switch 226 is turned ON for current to flow to the output stage again. Charge pump control 230 continuously controls switches 224 and 226 in this manner each switching cycle to keep the output voltage regulated within the desired window, for example, between $V_{TH+}$ and $V_{TH-}$ in waveform 262. As such output voltage $V_{OUT}$ is a substantially constant DC voltage.

In addition to switch 224 and switch 226, charge pump 240 also includes switch 228 to supply current to supply voltage $V_{CC}$ of resonant control block 202 when needed. During a positive half-cycle of quasi-sinusoidal AC current $I_{LC}$, switch 228 is turned ON when supply voltage $V_{CC}$ of resonant control block 202 discharges down and reaches pre-determined lower threshold voltage level $V_{CC-}$ in waveform 260. Switch 228 is then turned OFF again when supply voltage $V_{CC}$ of resonant control block 202 charges back up and reaches pre-determined upper threshold voltage $V_{CC+}$ in waveform 260. During a negative half-cycle of quasi-sinusoidal AC current $I_{LC}$, switch 224 is ON, and switches 226 and 228 are OFF.

The operation of charge pump 240 of power converter 200 is discussed below, with reference to waveforms 260-270 from t=$t_0$ to t=$t_9$. As illustrated in FIG. 2C, between t=$t_0$ to t=$t_6$, charge pump 240 operates in a normal charge pump mode, during which output voltage $V_{OUT}$ is charging toward pre-determined upper threshold level $V_{TH+}$ in waveform 262. In the normal charge pump mode, charge pump control 230 is configured to turn OFF switch 224 and turn ON switch 226 to provide a path for the positive portion ($I_{LC+}$) of quasi-sinusoidal AC current $I_{LC}$ to flow from resonant circuit 212, through switch 226, to output capacitor 236 and output load 238 of the output stage of power converter 200. Also, in the normal charge pump mode, charge pump control 230 is configured to turn ON switch 224 and turn OFF switch 226 to provide a path for the negative portion ($I_{LC-}$) of quasi-sinusoidal AC current $I_{LC}$ to flow to ground and back to resonant circuit 212.

As shown in waveform 264 of FIG. 2C, between t=$t_2$ to t=$t_4$, quasi-sinusoidal AC current $I_{LC}$ is in a positive half-cycle. At t=$t_2$, charge pump control 230 is configured to turn OFF switch 224 by switching the control signal to the gate of switch 224 (VG:S3) LOW, as shown in waveform 270. At t=$t_3$, charge pump control 230 is configured to turn ON switch 226 by switching the control signal to the gate of switch 226 (VG:S4) HIGH, as shown in waveform 268.

During the positive half-cycle of quasi-sinusoidal AC current $I_{LC}$, (i.e., between t=$t_3$ and t=$t_4$), the positive portion ($I_{LC+}$) of quasi-sinusoidal AC current $I_{LC}$ flows from resonant circuit 212, through switch 226, to output capacitor 236 and output load 238. As a result, output voltage $V_{OUT}$ is charging toward pre-determined upper threshold level $V_{TH+}$ in waveform 262.

It is noted that, during the normal charge pump mode, at t=$t_2$, supply voltage $V_{CC}$ across capacitor 218 reaches pre-determined lower threshold level $V_{CC-}$ in waveform 260. Charge pump control 230 is configured to turn OFF switch 224 and turn ON switch 228, while switch 226 is OFF, to provide a path for the positive portion ($I_{LC+}$) of quasi-sinusoidal AC current $I_{LC}$ to flow from resonant circuit 212, through switch 228, to supply voltage $V_{CC}$ of resonant control block 202. As can be seen in waveform 260, between t=$t_2$ and t=$t_3$, supply voltage $V_{CC}$ is charging. At t=$t_3$, as supply voltage $V_{CC}$ reaches pre-determined upper threshold level $V_{CC+}$ in waveform 260, charge pump control 230 is configured to turn OFF switch 228 to stop charging supply voltage $V_{CC}$, as shown in waveform 266. Also, as shown in waveforms 262, 268, and 270, at t=$t_3$, charge pump control 230 is configured to turn ON switch 226, while switch 224 is OFF, to charge output voltage $V_{OUT}$ as described above.

As shown in waveform 264 of FIG. 2C, between t=$t_4$ to t=$t_5$, quasi-sinusoidal AC current $I_{LC}$ is in a negative half-cycle. At t=$t_4$, charge pump control 230 is configured to turn ON switch 224 by switching the control signal to the gate of switch 224 (VG:S3) HIGH, as shown in waveform 270. Also, at t=$t_4$, charge pump control 230 is configured to turn OFF switch 226 by switching the control signal to the gate of switch 226 (VG:S4) LOW, as shown in waveform 268. During the negative half-cycle (i.e., between t=$t_4$ and t=$t_5$), the negative portion ($I_{LC-}$) of quasi-sinusoidal AC current $I_{LC}$ flows from resonant circuit 212 to ground, through switch 224, and back to resonant circuit 212. As a result, output voltage $V_{OUT}$ is discharging between t=$t_4$ and t=$t_5$ as shown in waveform 262.

As shown in waveform 264 of FIG. 2C, at t=$t_5$, quasi-sinusoidal AC current $I_{LC}$ starts another positive cycle. At t=$t_5$, charge pump control 230 is configured to turn OFF switch 224 and turn ON switch 226 to charge output voltage $V_{OUT}$, as shown in waveforms 268 and 270. However, as shown in waveform 262, at t=$t_6$, output voltage $V_{OUT}$ reaches pre-determined upper threshold level $V_{TH+}$. As output voltage $V_{OUT}$ is monitored by charge pump control 230 receiving output stage feedback signal $V_{FB}$, at t=$t_6$, charge pump control 230 is configured to turn OFF switch 226 and turn ON switch 224, as shown in waveforms 268 and 270, marking the end of the normal charge pump mode. Also, as a result of output voltage $V_{OUT}$ reaching pre-determined upper threshold level $V_{TH+}$, charge pump 240 enters a charge pump bypass mode.

As shown in waveform 262 of FIG. 2C, between t=$t_6$ to t=$t_9$, charge pump 240 operates in the charge pump bypass mode, during which output voltage $V_{OUT}$ is discharging toward a pre-determined lower threshold level $V_{TH-}$. As can been seen in waveform 268, switch 226 remains OFF during the charge pump bypass mode between t=$t_6$ to t=$t_9$, such that no quasi-sinusoidal AC current $I_{LC}$, regardless of positive and negative half-cycles, is supplied to the output stage of power converter 200. As a result, between t=$t_6$ to t=$t_9$, output voltage $V_{OUT}$ discharges from pre-determined upper threshold level $V_{TH+}$ to pre-determined lower threshold level $V_{TH-}$. Also, during the charge pump bypass mode, as shown in waveform 270, between t=$t_6$ to t=$t_7$, charge pump control 230 is configured to turn ON switch 224 to provide a path for quasi-sinusoidal AC current $I_{LC}$, regardless of positive and negative half-cycles, to flow to ground, and from ground back to resonant circuit 212, for example.

It is noted that, as shown in waveform 270, at t=$t_7$, supply voltage $V_{CC}$ again reaches pre-determined lower threshold level $V_{CC-}$ as shown in waveform 260. Between t=$t_7$ to t=$t_8$, charge pump control 230 is configured to turn OFF switch 224 and turn ON switch 228, while switch 226 is OFF, to charge supply voltage $V_{CC}$ of resonant control block 202 back to pre-determined upper threshold level $V_{CC+}$, as shown in waveforms 260, 266, 268, and 270. As supply voltage $V_{CC}$ of resonant control block 202 reaches pre-determined upper threshold level $V_{CC+}$ at t=$t_8$, charge pump control 230 is configured to turn OFF switch 228 and turn ON switch 224, while switch 226 is OFF, to stop charging supply voltage $V_{CC}$ and direct quasi-sinusoidal AC current $I_{LC}$ to ground through switch 224.

As shown in waveform 262, at t=$t_9$, output voltage $V_{OUT}$ reaches pre-determined lower threshold level $V_{TH-}$. As output voltage $V_{OUT}$ is monitored by charge pump control 230 receiving output stage feedback signal $V_{FB}$, at t=$t_9$, charge pump control 230 is configured to turn ON switch 226 and turned OFF switch 224 to start charging output voltage $V_{OUT}$ again. As such, charge pump 240 switches from the charge pump bypass mode back to normal charge pump mode.

With resonant half-bridge 220 supplying current $I_{LC}$ and charge pump 240 operating as described above, both output voltage $V_{OUT}$ and supply voltage $V_{CC}$ of resonant control block 202 are maintained within their respective voltage windows, thus staying substantially constant. For example, output voltage $V_{OUT}$ may be kept at a desired output range, such as 3.3 volts, 5 volts, 12 volts, and 15 volts, within the ±5% window, thus substantially constant. Similarly, supply voltage $V_{CC}$ of resonant control block 202 may also be kept at a desired range, such as 5 volts and 15 volts, within the ±5% window, thus substantially constant.

Figure 3:
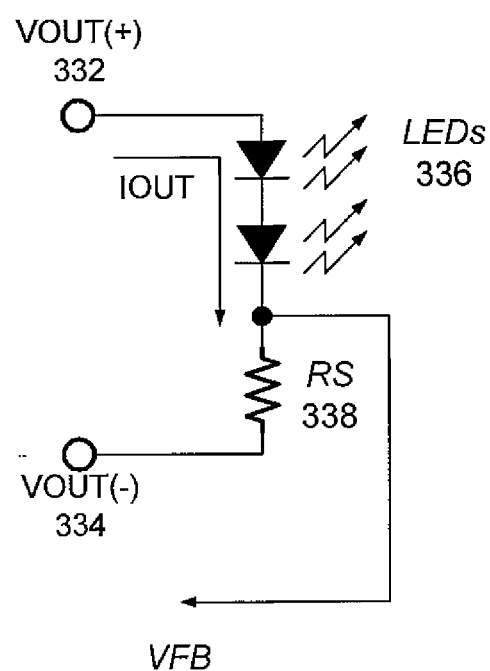
FIG. 3 illustrates an exemplary output stage of a power converter for providing a constant output current, according to one implementation of the present application.

FIG. 3 illustrates an exemplary output stage of a power converter for providing a constant output current, according to one implementation of the present application. As illustrated in FIG. 3, an exemplary output stage includes light emitting diodes (LEDs) 336 and current sensor 338 ($R_S$) connected in series between positive output terminal 332 $V_{OUT+}$ and negative output terminal 334 $V_{OUT-}$. For example, LEDs 336 and current sensor 338 may be coupled to positive output terminal 232 $V_{OUT+}$ and negative output terminal 234 $V_{OUT-}$ of power converter 200 in FIG. 2A to replace output capacitor 236 and output load 238 to provide a constant output current $I_{OUT}$ instead of a constant output voltage $V_{OUT}$. As such, the output stage can be configured for a constant output current $I_{OUT}$, for example, when driving LEDs 336. The constant output current $I_{OUT}$ can be monitored using current sensor 338. The resulting voltage drop across current sensor 338 may be fed back as output stage feedback signal $V_{FB}$ to a charge pump circuit, such as charge pump control 230 in FIG. 2A, to maintain the current at a constant level.

The present inventive concepts utilize a resonant half-bridge and a charge pump to form a power converter for providing a substantially constant DC voltage and/or a substantially constant current at an output stage of the power converter. The resonant half-bridge includes a half-bridge and a resonant circuit coupled to a switched node of the half-bridge. The resonant half-bridge is configured to provide a quasi-sinusoidal AC current with a substantially constant amplitude and approximately 50% duty cycle to the charge pump. The charge pump is configured to selectively provide a positive portion of the quasi-sinusoidal AC current to an output stage of the power converter, and to selectively shunt to ground a negative portion of the quasi-sinusoidal AC current, to provide a substantially constant output voltage and/or current.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A power converter comprising:
   a resonant half-bridge including a first power switch and a second power switch for driving a resonant circuit of said resonant half-bridge;
   a charge pump coupled between said resonant half-bridge and an output stage of the power converter;
   wherein said charge pump is configured to
      charge the resonant circuit to a first voltage while disconnecting the resonant circuit from the output stage,
      after charging the resonant circuit to the first voltage, connect the resonant circuit to the output stage to selectively provide a positive current from said resonant circuit to an output stage of said power converter; and
      after connecting the resonant circuit to the output stage, connect the resonant circuit to a second voltage while disconnecting the resonant circuit from the output stage.

2. The power converter of claim 1, wherein said charge pump is configured to selectively shunt to ground a negative current from said resonant circuit.

3. The power converter of claim 2, wherein said positive current and said negative current are parts of a quasi-sinusoidal AC current from said resonant circuit.

4. The power converter of claim 1, wherein said resonant circuit is coupled to a switched node between said first power switch and said second power switch.

5. The power converter of claim 1, wherein said resonant circuit comprises a series L-C circuit.

6. The power converter of claim 1, wherein said resonant half-bridge comprises a resonant control block for driving said first and second power switches.

7. The power converter of claim 1, wherein said charge pump comprises a charge pump control for driving a first control device to selectively provide said positive current from said resonant circuit to said output stage.

8. The power converter of claim 1, wherein said charge pump comprises a charge pump control for driving a second control device to selectively shunt to ground a negative current from said resonant circuit.

9. The power converter of claim 1, wherein said charge pump comprises a charge pump control for driving a third control device to selectively supply a charging current from said resonant circuit to a resonant control block in said resonant half-bridge.

10. The power converter of claim 7, wherein said charge pump control drives said first control device to selectively provide said positive current from said resonant circuit to said output stage based on an output stage feedback signal.

11. A power converter comprising:
    a resonant half-bridge including a first power switch and a second power switch for driving a series L-C circuit of said resonant half-bridge; and
    a charge pump coupled between said resonant half-bridge and an output stage of the power converter;
    said charge pump having a charge pump control for driving a first control device to selectively provide a positive current from said series L-C circuit to an output stage of said power converter, wherein said charge pump is configured to
       charge the series L-C circuit to a first voltage while disconnecting the series L-C circuit from the output stage using the first control device,
       after charging the series L-C circuit to the first voltage, connect the series L-C circuit to the output stage using the first control device, and
       after connecting the series L-C circuit to the output stage, charge the series L-C circuit to a second voltage while disconnecting the series L-C circuit from the output stage using the first control device.

12. The power converter of claim 11, said charge pump control of said charge pump is configured to drive a second control device to selectively shunt to ground a negative current from said series L-C circuit.

13. The power converter of claim 12, wherein said positive current and said negative current are parts of a quasi-sinusoidal AC current from said series L-C circuit.

14. The power converter of claim 11, said charge pump control of said charge pump is configured to drive a third control device to selectively supply a charging current from said series L-C circuit to a resonant control block in said resonant half-bridge.

15. The power converter of claim 11, wherein said series L-C circuit is coupled to a switched node between said first power switch and said second power switch.

16. The power converter of claim 11, wherein said resonant half-bridge comprises a resonant control block for driving said first and second power switches.

17. The power converter of claim 16, wherein said resonant control block is configured to drive said first and second power switches based on a switching stage feedback signal.

18. The power converter of claim 16, wherein said resonant control block is configured to drive said first power switch using a first control signal, and said second power switch using a second control signal, said first control signal and said second control signal having a substantially equal duty cycle.

19. The power converter of claim 11, wherein said charge pump control drives said first control device to selectively provide said positive current from said series L-C circuit to said output stage based on an output stage feedback signal.

20. The power converter of claim 11, wherein said series L-C circuit includes a chip inductor.

21. The power converter of claim 11, wherein:
    the charge pump is configured to charge the series L-C circuit to the first voltage using a second control device; and
    the charge pump is configured to charge the series L-C circuit to the second voltage using a third control device;

the charge pump is configured to connect and disconnected the output stage via a first switch coupled between the charge pump and the output stage;

the first control device is coupled between the charge pump and the output stage;

the charge pump is configured to charge the series L-C circuit to the first voltage using a second control device coupled between a first power supply node and the series L-C circuit; and the charge pump is configured to charge the series L-C circuit to the second voltage using a third control device coupled between a second power supply node.

22. The power converter of claim 11, wherein:
the first voltage is a positive supply voltage; and
the second voltage is a ground voltage.

23. The power converter of claim 1, wherein
the charge pump is configured to connect and disconnect the output stage to and from the output stage via a first switch coupled between the charge pump and the output stage;

the charge pump is configured to charge the resonant circuit to the first voltage using a second switch device coupled between a first power supply node and the resonant circuit; and the charge pump is configured to charge the resonant circuit to the second voltage using a third switch device coupled between a second power supply node and the resonant circuit.

24. A method of operating a power converter comprising a half-bridge, a resonant circuit coupled between the half-bridge and a load port of the power converter and a switching circuit coupled between the resonant circuit and the power converter, the method comprising:

charging the resonant circuit to a first voltage while disconnecting the resonant circuit from the load port, after charging the resonant circuit to the first voltage, connecting the resonant circuit to the load port, and after connecting the resonant circuit to the load port, charging the resonant circuit to a second voltage while disconnecting the resonant circuit from the load port.

25. The method of claim 24, further comprising:
applying an AC voltage to the half-bridge, wherein
the steps of charging the resonant circuit to the first voltage and connecting the resonant circuit to the load port occur during a positive half-cycle of the AC voltage; and
the step of charging the resonant circuit to the second voltage occurs during a negative half-cycle of the AC voltage.

* * * * *